United States Patent
Ikeda et al.

(10) Patent No.: US 9,520,236 B2
(45) Date of Patent: Dec. 13, 2016

(54) MULTILAYER CERAMIC ELECTRONIC COMPONENT

(71) Applicant: Murata Manufacturing Co., Ltd., Nagaokakyo-shi, Kyoto-fu (JP)

(72) Inventors: Jun Ikeda, Nagaokakyo (JP); Kota Zenzai, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 64 days.

(21) Appl. No.: 14/677,059

(22) Filed: Apr. 2, 2015

(65) Prior Publication Data

US 2016/0172108 A1 Jun. 16, 2016

(30) Foreign Application Priority Data

Dec. 11, 2014 (JP) ................. 2014-251277

(51) Int. Cl.
*H01G 4/232* (2006.01)
*H01G 4/30* (2006.01)
*H01G 4/012* (2006.01)
*H01G 4/12* (2006.01)
*H01G 4/248* (2006.01)

(52) U.S. Cl.
CPC ............ *H01G 4/2325* (2013.01); *H01G 4/012* (2013.01); *H01G 4/12* (2013.01); *H01G 4/248* (2013.01); *H01G 4/30* (2013.01)

(58) Field of Classification Search
CPC .......... H01G 4/232; H01G 4/30; H01G 4/012; H01G 4/12; H01G 4/228; H01G 4/2325; H01G 4/224; H01G 4/248
See application file for complete search history.

(56) References Cited

U.S. PATENT DOCUMENTS

| 8,988,854 | B1 * | 3/2015 | Zenzai | ..................... | H01G 4/30 361/301.4 |
| 2010/0067170 | A1 * | 3/2010 | Koga | ..................... | H01G 4/228 361/306.3 |
| 2016/0141103 | A1 * | 5/2016 | Hamanaka | ............. | H01G 4/012 361/301.4 |

FOREIGN PATENT DOCUMENTS

JP 10-284343 A 10/1998

* cited by examiner

*Primary Examiner* — Dion R Ferguson
(74) *Attorney, Agent, or Firm* — Keating & Bennett, LLP

(57) ABSTRACT

A multilayer ceramic electronic component includes a ceramic element body including internal electrodes and external electrodes electrically connected to respective internal electrodes. Each of the external electrodes includes a sintered metal layer including glass and metal and a conductive resin layer including resin and metal particles. In a cross section of the multilayer ceramic capacitor, at an interface between the sintered metal layer and the conductive resin layer, recesses having a shape in which a dimension of an inner portion is larger than a dimension of an inlet are present, and L1/L2 is about 0.2 or more and about 1.5 or less, where L1 is a length along the interface at which the glass of the sintered metal layer is exposed at the interface, and L2 is a length along the interface at which the metal of the sintered metal layer is exposed at the interface.

17 Claims, 5 Drawing Sheets

MULTILAYER CERAMIC ELECTRONIC COMPONENT

BACKGROUND OF THE INVENTION

1. Field of the Invention

The present invention relates to a multilayer ceramic electronic component and particularly relates to a multilayer ceramic electronic component including a ceramic element body, in which internal electrodes are provided, and external electrodes arranged on end surfaces of the ceramic element body so as to be electrically connected to respective ones of the internal electrodes. For example, the present invention relates to a multilayer ceramic capacitor, a multilayer ceramic inductor, a multilayer ceramic thermistor, or a multilayer ceramic piezoelectric component.

2. Description of the Related Art

For example, as disclosed in Japanese Unexamined Patent Application Publication No. 10-284343, a generally known multilayer electronic component includes external electrodes formed on both end surfaces of a ceramic element body in which internal electrodes are provided to be exposed in the surfaces of the ceramic element body, the external electrodes each including a sintered electrode layer containing a metal as a main component, a conductive resin electrode layer formed on the surface the sintered electrode layer and containing metal particles, and a plating layer formed on the surface of the conductive resin electrode layer. In the multilayer ceramic electronic component, the conductive resin electrode layer is formed between the sintered electrode layer and the plating layer, thereby resolving to some extent the problem of cracks being caused in the ceramic element body due to a temperature cycle during use and the problem of weakening resistance to deflection of a substrate when the multilayer ceramic electric component is mounted on the substrate.

However, the general multilayer ceramic electronic component described above has low adhesive force between the conductive resin electrode layer containing a large amount of resin and the sintered electrode layer composed of a metal. Therefore, deflection of a substrate on which the multilayer ceramic electronic component is mounted is absorbed by the conductive resin electrode layer, but the low adhesive force between the conductive resin electrode layer and the sintered electrode layer causes the problem of separation between the conductive resin electrode layer and the sintered electrode layer.

SUMMARY OF THE INVENTION

Accordingly, preferred embodiments of the present invention provide a multilayer ceramic electronic component having strong adhesive force between a conductive resin electrode layer and a sintered electrode layer.

According to a preferred embodiment of the present invention, A multilayer ceramic electronic component includes a ceramic element body in which internal electrodes are provided and which includes a first main surface, a second main surface facing the first main surface, a first side surface connected to the first main surface and the second main surface, a second side surface facing the first side surface, a first end surface connected to the first main surface, the second main surface, the first side surface, and the second side surface, and a second end surface facing the first end surface; and external electrodes arranged on at the least the first and second end surfaces and at least a portion of the first main surface or the second main surface of the ceramic element body so as to be electrically connected to respective ones of the internal electrodes. Each of the external electrodes includes a sintered metal layer, a conductive resin layer, and a plating layer which are arranged in that order from the ceramic element body. The conductive resin layer includes resin and metal particles. The sintered metal layer includes glass and metal. When a cross section including an interface between the sintered metal layer and the conductive resin layer is viewed from any one of the first main surface, the second main surface, the first side surface, and the second side surface, the sintered metal layer includes a plurality of recesses each including an inlet extending along the interface and an inner portion extending from the interface into the sintered metal layer, each of the recesses having a shape in which a dimension of the inner portion is larger than a dimension of the inlet measured along the interface. $L1/L2$ is about 0.2 or more and about 1.5 or less, where $L1$ is a length along the interface at which the glass of the sintered metal layer is exposed at the interface, and $L2$ is a length along the interface at which the metal of the sintered metal layer is exposed at the interface.

In a multilayer ceramic electronic component according to a preferred embodiment of the present invention, the metal of the sintered metal layer includes Cu.

In a multilayer ceramic electronic component according to a preferred embodiment of the present invention, the metal particles of the conductive resin layer include Cu and/or Ag.

In a multilayer ceramic electronic component according to a preferred embodiment of the present invention, the plating layer includes a Ni plating layer.

A multilayer ceramic electronic component according to another preferred embodiment of the present invention includes a ceramic element body in which internal electrodes are provided and which includes a first main surface, a second main surface facing the first main surface, a first side surface connected to the first main surface and the second main surface, a second side surface facing the first side surface, a first end surface connected to the first main surface, the second main surface, the first side surface, and the second side surface, and a second end surface facing the first end surface; and external electrodes arranged on at the least the first and second end surfaces and at least a portion of the first main surface or the second main surface of the ceramic element body so as to be electrically connected to respective ones of the internal electrodes. Each of the external electrodes includes a sintered metal layer, a conductive resin layer, and a plating layer which are arranged in that order from the ceramic element body. The conductive resin layer includes resin and metal particles. The sintered metal layer includes glass and metal. When a cross section including an interface between the sintered metal layer and the conductive resin layer is viewed from any one of the first main surface, the second main surface, the first side surface, and the second side surface, the sintered metal layer includes a plurality of recesses each including an inlet extending along the interface and an inner portion extending from the interface into the sintered metal layer, each of the recesses having a shape in which a dimension of the inner portion is larger than a dimension of the inlet measured along the interface. $L1/L2$ is about 0.2 or more and about 1.5 or less, where $L1$ is a length along the interface at which the glass of the sintered metal layer is exposed at the interface, and $L2$ is a length along the interface at which the metal of the sintered metal layer is exposed at the interface. A material of the conductive resin layer is disposed in at least some of the recesses.

In a multilayer ceramic electronic component according to a preferred embodiment of the present invention, at least some of the metal particles of the conductive resin layer are disposed in the at least some of the recesses.

In a multilayer ceramic electronic component according to a preferred embodiment of the present invention, at least some of the resin of the conductive resin layer is disposed in the at least some of the recesses.

In a multilayer ceramic electronic component according to a preferred embodiment of the present invention, the metal of the sintered metal layer includes Cu.

In a multilayer ceramic electronic component according to a preferred embodiment of the present invention, the metal particles of the conductive resin layer include Cu and/or Ag.

In a multilayer ceramic electronic component according to a preferred embodiment of the present invention, the plating layer includes a Ni plating layer.

A multilayer ceramic electronic component according to another preferred embodiment includes a ceramic element body in which internal electrodes are provided and which includes a first main surface, a second main surface facing the first main surface, a first side surface connected to the first main surface and the second main surface, a second side surface facing the first side surface, a first end surface connected to the first main surface, the second main surface, the first side surface, and the second side surface, and a second end surface facing the first end surface; and external electrodes arranged on at the least the first and second end surfaces and at least a portion of the first main surface or the second main surface of the ceramic element body so as to be electrically connected to respective ones of the internal electrodes. Each of the external electrodes includes a sintered metal layer, a conductive resin layer, and a plating layer which are arranged in that order from the ceramic element body. The conductive resin layer includes resin and metal particles. The sintered metal layer includes glass and metal. When a cross section including an interface between the sintered metal layer and the conductive resin layer is viewed from any one of the first main surface, the second main surface, the first side surface, and the second side surface, the sintered metal layer includes a plurality of recesses each including an inlet extending along the interface and an inner portion extending from the interface into the sintered metal layer, each of the recesses having a shape in which a dimension of the inner portion is larger than a dimension of the inlet measured along the interface. L1/L2 is about 0.2 or more and about 1.5 or less, where L1 is a length along the interface at which the glass of the sintered metal layer is exposed at the interface, and L2 is a length along the interface at which the metal of the sintered metal layer is exposed at the interface. A material of the conductive resin layer is disposed in at least some of the recesses. The metal particles include first particles and second particles with shapes that are different from the first particles.

In a multilayer ceramic electronic component according to a preferred embodiment of the present invention, a ratio of a number of the second particles to a number of the first particles is about 3/7 to about 7/3, and the first particles have spherical or substantially spherical shapes, and the second particles have flat or substantially flat shapes.

In a multilayer ceramic electronic component according to a preferred embodiment of the present invention, at least some of the metal particles of the conductive resin layer are disposed in the at least some of the recesses.

In a multilayer ceramic electronic component according to a preferred embodiment of the present invention, the metal of the sintered metal layer includes Cu, the metal particles of the conductive resin layer include Cu and/or Ag, and the plating layer includes a Ni plating layer.

In a multilayer ceramic electronic component according to a preferred embodiment of the present invention, a ratio of a number of the second particles to a number of the first particles is about 3/7 to about 7/3, the first particles are configured such that a ratio of a long side to a short side is about 5/1 or more in a cross section of the metal particles, and the second particles are configured such that a ratio of a long side to a short side is less than about 5/1 in a cross section of the metal particles.

In a multilayer ceramic electronic component according to a preferred embodiment of the present invention, at least some of the metal particles of the conductive resin layer are disposed in the at least some of the recesses.

In a multilayer ceramic electronic component according to a preferred embodiment of the present invention, the metal of the sintered metal layer includes Cu, the metal particles of the conductive resin layer includes Cu and/or Ag, and the plating layer includes Ni plating layer.

According to various preferred embodiments of the present invention, multilayer ceramic electronic components having good adhesive force between a conductive resin layer and a sintered metal layer are provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
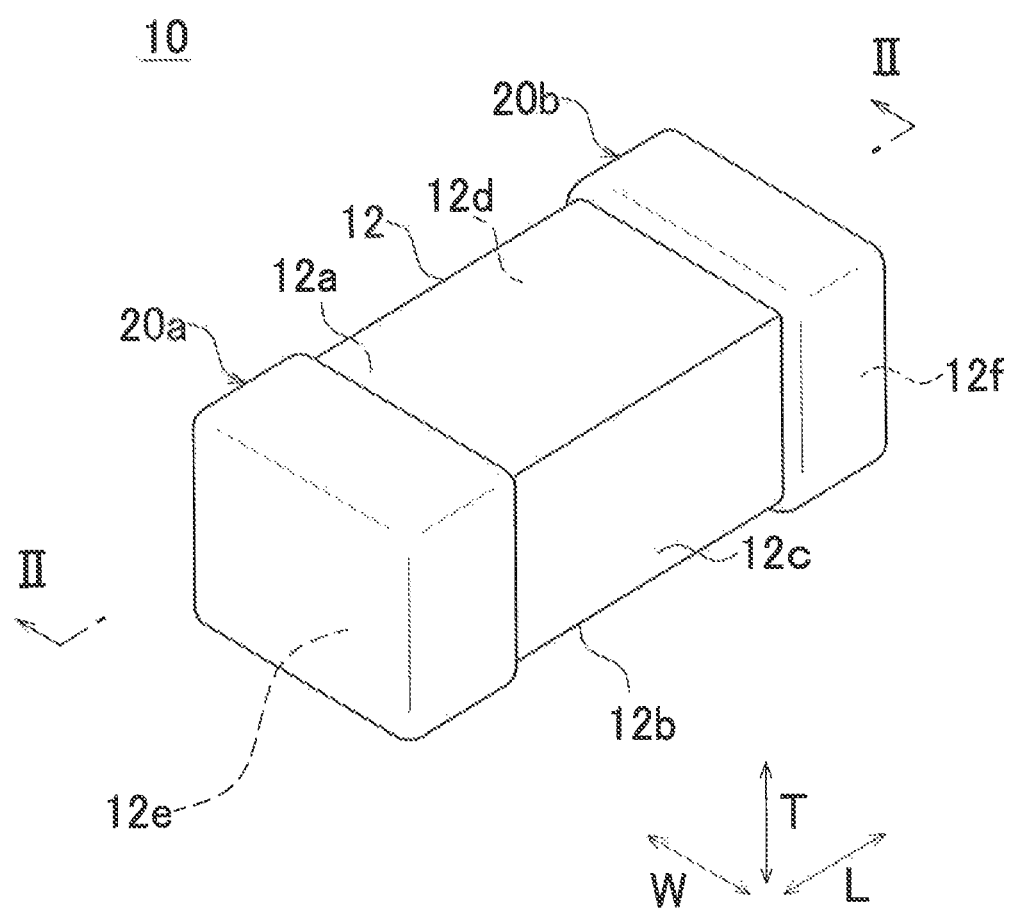
FIG. 1 is a perspective view illustrating an example of a multilayer ceramic capacitor according to a preferred embodiment of the present invention.

A multilayer ceramic electronic component 10 shown in FIG. 1 includes a ceramic element body 12, for example, preferably having a substantially rectangular parallelepiped shape. The ceramic element body 12 includes a plurality of stacked ceramic layers 14 and also includes a first main surface 12a and a second main surface 12b which face each other, a first side surface 12c and a second side surface 12d which face each other, and a first end surface 12e and a second end surface 12f which face each other. The first side surface 12c and the second side surface 12d are each connected to the first main surface 12a and the second main surface 12b. The first end surface 12e and the second end surface 12f are each connected to the first main surface 12a, the second main surface 12b, the first side surface 12c, and the second side surface 12d. The ceramic element body 12 preferably includes rounded corners and edges. In addition, the ceramic element body 12 may be formed to have other sizes and shapes.

Examples of a ceramic material which can be used for the ceramic layers 14 of the ceramic element body 12 include dielectric ceramics composed of $BaTiO_3$, $CaTiO_3$, $SrTiO_3$, $CaZrO_3$, or the like as a main component. An accessory component such as a Mn compound, a Fe compound, a Cr compound, a Co compound, a Ni compound, or the like may be added to the main component. The thickness of each of the ceramic layers 14 of the ceramic element body 12 preferably is, for example, about 0.5 μm to about 10 μm.

Figure 2:
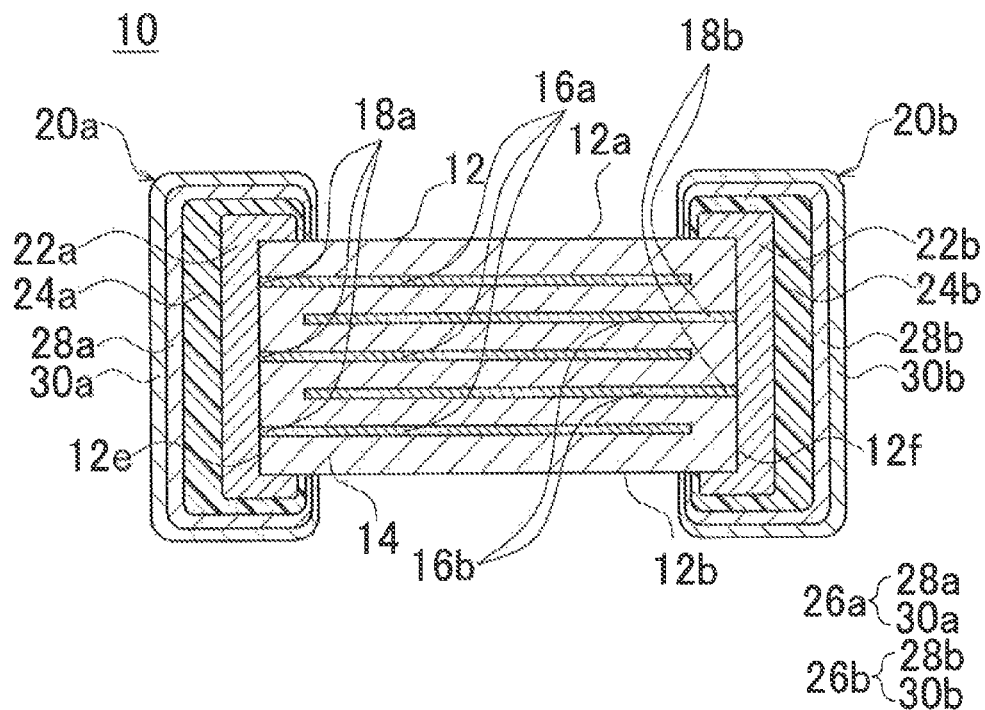
FIG. 2 is a cross-sectional view of the multilayer ceramic capacitor shown in FIG. 1, taken along line II-II in FIG. 1.

As shown in FIG. 2, a plurality of first and second internal electrodes 16a and 16b preferably having, for example, a substantially rectangular shape are provided in the ceramic element body 12 so as to be alternately arranged at equal or substantially equal intervals along the thickness direction of the ceramic element body 12.

The first and second internal electrodes 16a and 16b include exposed end portions 18a and 18b exposed at the first and second end surfaces 12e and 12f, respectively, of the ceramic element body 12. Specifically, the exposed portions 18a at the ends of the first internal electrodes 16a are exposed at the first end surface 12e of the ceramic element body 12. Also, the exposed portions 18b at the ends of the second internal electrodes 16b are exposed at the second end surface 12f of the ceramic element body 12.

Further, the first and second internal electrodes 16a and 16b are parallel or substantially parallel with the first and second main surfaces 12a and 12b of the ceramic element body 12. In addition, the first and second internal electrodes 16a and 16b face each other with the ceramic layers 14 disposed therebetween in the thickness direction of the ceramic element body 12.

The thickness of each of the first and second internal electrodes 16a and 16b preferably is, for example, about 0.2 μm to about 2 μm. However, the thickness of each of the first and second internal electrodes 16a and 16b is not particularly limited.

The first and second internal electrodes 16a and 16b include, for example, a base metal Ni as a conductive material. The first and second internal electrodes 16a and 16b may be composed of a metal, such as Ni, Cu, Ag, Pd, Au, or the like, or an alloy containing one of these metals, such as an Ag—Pd alloy or the like.

Further, first and second external electrodes 20a and 20b are provided on the first and second end surfaces 12e and 12f, respectively, of the ceramic element body 12.

The first external electrode 20a extends from the first end surface 12e to the first and second main surfaces 12a and 12b and the first and second side surfaces 12c and 12d of the ceramic element body 12. In this case, the first external electrode 20a is electrically connected to the exposed portions 18a of the first internal electrodes 16a.

The second external electrode 20b extends from the second end surface 12f to the first and second main surfaces 12a and 12b and the first and second side surfaces 12c and 12d of the ceramic element body 12. In this case, the second external electrode 20b is electrically connected to the exposed portions 18b of the second internal electrodes 16b.

The external electrode 20a includes a sintered metal layer 22a, a conductive resin layer 24a, and a plating layer 26a which are arranged in that order from the ceramic element body 12. Similarly, the external electrode 20b includes a sintered metal layer 22b, a conductive resin layer 24b, and a plating layer 26b which are arranged in that order from the ceramic element body 12 side.

The sintered metal layers 22a and 22b include a base metal Cu as a main component and are provided on the outer surfaces of the ceramic element body 12, that is, on the first and second end surfaces 12e and 12f, etc. to be physically and electrically connected to the first and second internal electrodes 16a and 16b, respectively. The sintered metal layers 22a and 22b are formed preferably by applying a conductive paste containing a Cu powder and glass powder to the outer surfaces of the ceramic element body 12 and then baking the paste. Each of the sintered metal layers 22a and 22b preferably has a thickness of, for example, about 10 μm to about 30 μm.

Each of the conductive resin layers 24a and 24b contains metal particles as a conductive material. The conductive resin layers 24a and 24b are arranged on the sintered metal layers 22a and 22b so as to cover the sintered metal layers 22a and 22b, respectively. Each of the conductive resin layers 24a and 24b is a layer formed preferably by heat-curing a mixture containing a first metal powder of Cu or Ag which forms metal particles, a second metal powder having a predetermined average particle diameter, and a resin.

Figure 3:
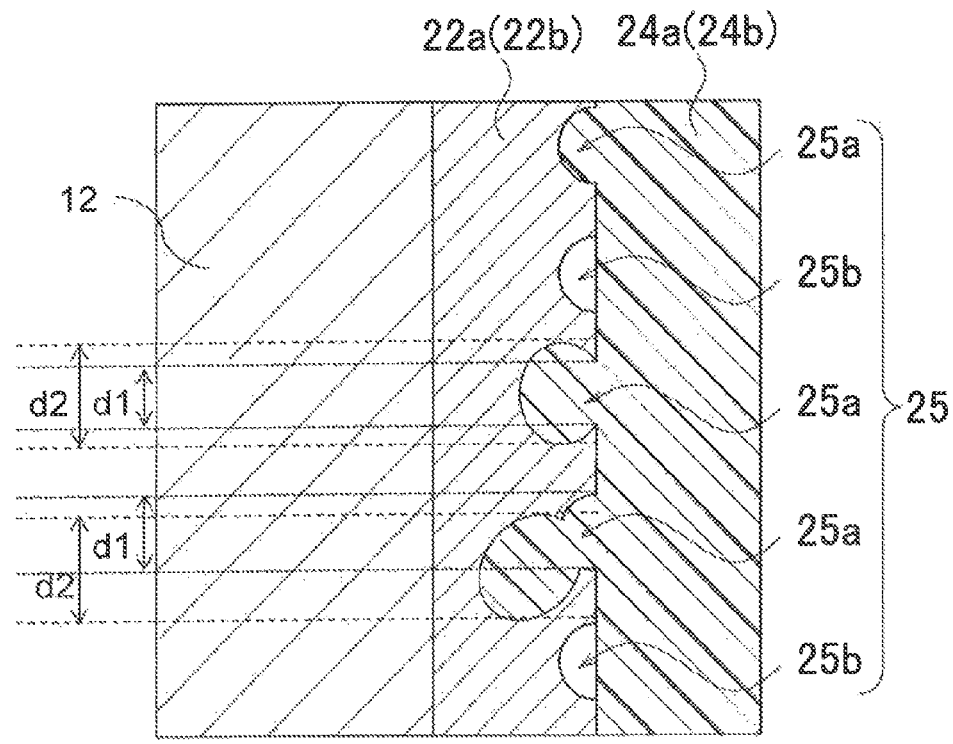
FIG. 3 is a diagram illustrating an interface between a conductive resin layer and a sintered metal layer in which recesses are present.
Figure 7:
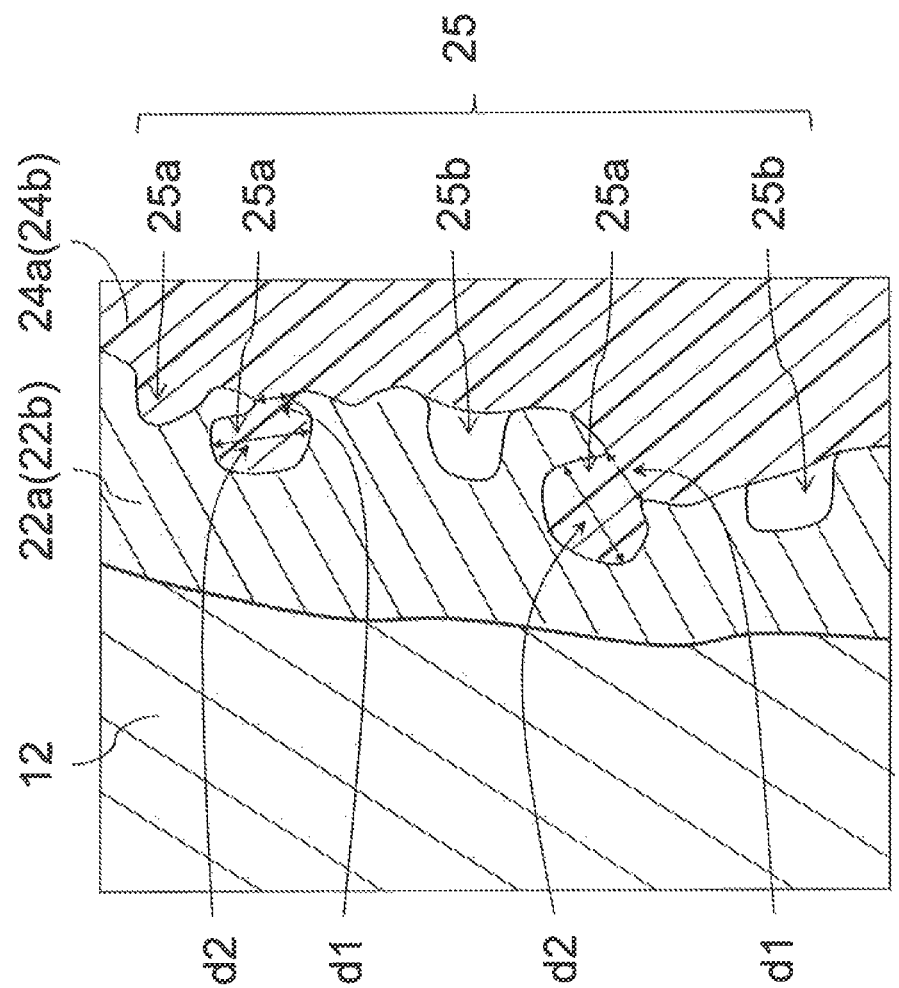
FIG. 7 is a diagram, similar to FIG. 3, illustrating an interface between a conductive resin layer and a sintered metal layer in which recesses are present.

The sintered metal layers 22a and 22b are preferably formed by applying the conductive paste to the end surfaces of the ceramic element body and then baking the paste. In this case, as shown in FIGS. 3 and 7, a plurality of recesses 25 are formed in the surfaces of the sintered metal layers 22a and 22b along an interface between the sintered metal layers 22a and 22b and the conductive resin layers 24a and 24b. When the conductive resin layers 24a and 24b are formed on the sintered metal layers 22a and 22b, respectively, a material of the conductive resin layers 24a and 24b may or may not enter the recesses 25 in the surfaces of the sintered metal layers 22a and 22b, respectively. That is, the recesses 25 include filled recesses 25a in which a material of the conductive resin layers 24a and 24b has entered, and empty recesses 25b in which a material of the conductive resin layers 24a and 24b has not entered. It should be noted that the filled recesses 25a may be completely or only partially filled with the material of the conductive resin layers 24a and 24b. When the material of the conductive resin layers 24a and 24b enters the filled recesses 25a of the sintered metal layers 22a and 22b, an adhesive strength between the sintered metal layers 22a and 22b and the conductive resin layers 24a and 24b is enhanced by an anchor effect. Therefore, in order to prevent separation between the sintered metal layers 22a and 22b and the conductive resin layers 24a and 24b, it is preferred to decrease the number of the empty recesses 25b which the material of the conductive resin layers 24a and 24b does not enter.

The recesses 25 in the surfaces of the sintered metal layers 22a and 22b are observed preferably by using a section of a central portion in the width direction of the multilayer ceramic capacitor 10, that is, a surface defined in the length direction and the thickness direction of the multilayer ceramic capacitor 10 and exposed by grinding up to the central portion in the width direction. In this case, surface treatment is performed to avoid sagging due to grinding, and the interfaces between the sintered metal layers 22a and 22b and the conductive resin layers 24a and 24b are observed at a 1000 times magnification by using an SEM. The recesses 25 are located on the sintered metal layer side and opened toward the conductive resin layer side. Each of the recesses 25 is configured such that a dimension d2 of an inner portion extending from the interface into the sintered metal layer is larger than a dimension d1 of an inlet extending along the interface. The inlet of each of recess 25 is located at the portion of the recess 25 that is located along interface between the sintered metal layers 22a and 22b and the conductive resin layers 24a and 24b and opens to the surface of the conductive resin layers 24a and 24b. The dimension d1 is defined as a distance along the interface between the sintered metal layers 22a and 22b and the conductive resin layers 24a and 24b from one edge of the inlet to an opposite edge of the inlet in a cross-section of the inlet as shown in FIGS. 3 and 7. In other words, a dimension of the inlet is defined by d1. The dimension d2 of the inner portion is defined as a maximum dimension of the recess 25 extending in a direction parallel to the direction along which the dimension d1 is measured in a cross section of the recesses 25 as shown in FIGS. 3 and 7.

As noted above, a material of the conductive resin layers 24a and 24b enters some of the recesses 25 so as define filled recesses 25a. For example, the resin of the conductive resin layers 24a and 24b enters and is disposed in at least some of the recesses 25 to define the filled recesses 25a, and some of metal particles of the conductive resin layers 24a and 24b enter and are disposed in at least some of the recesses 25 to define the filled recesses 25a.

It should be noted that FIG. 3 shows a straight or substantially straight interface between the sintered metal layers 22a and 22b and the conductive resin layers 24a and 24b along which the recesses 25a and 25b are located, and FIG. 7 shows a meandering or non-straight interface between the sintered metal layers 22a and 22b and the conductive resin layers 24a and 24b along which the recesses 25a and 25b are located.

In addition, in order to achieve high adhesive strength between the sintered metal layers 22a and 22b and the conductive resin layers 24a and 24b, the number of the filled recesses 25a within a length range of about 70 μm along the interface is preferably about 2 or more, for example. In this case, the dimension d1 of the inlet of the filled recesses 25a is preferably about 1 μm to about 3 μm in a section including the sintered metal layers 22a and 22b, for example. In addition, the filled recesses 25a are preferably present at 5 positions or more at the interface in the width direction or the thickness direction, for example.

Each of the recesses 25 has a depth measured along a line of maximum length within the respective recess 25 extending perpendicular to the direction along which the dimension d1 is measured. The depth of the recesses 25 is preferably within a range of about 3 μm to about 5 μm, for example. A depth out of this range has difficulty in achieving the desired anchor effect.

The metal particles contained in the conductive resin layers 24a and 24b include flat particles with a flat shape and spherical particles with a spherical shape. Whether the metal particles are the flat particles or the spherical particles is determined by observing a cross section of a central portion in the width direction of the multilayer ceramic capacitor 10, which is a cross section of the conductive resin layers 24a and 24b. When the ratio of a long side to a short side in each of the metal particles contained in the conductive resin layers 24a and 24b is about 5/1 or more, the metal particle is regarded as a flat particle. When the ratio of a long side to a short side is less than about 5/1, the metal particle is regarded as a spherical particle. For example, a substantially flat shape is a shape which has at least one flat surface. The flat particles in the metal particles contained in the conductive resin layers 24a and 24b relaxes the stress applied to the external electrodes 20a and 20b, and the spherical particles in the metal particles contained in the conductive resin layers 24a and 24b secure electric connection.

Further, the ratio of the number of the spherical particles to the number of the flat particles in the metal particles contained in the conductive resin layers 24a and 24b preferably is about 3/7 to about 7/3, for example. The ratio is determined by observing a cross section of a central portion in the width direction of the multilayer ceramic capacitor 10, which is a cross section including the conductive resin layers 24a and 24b. The ratio of the flat particles to the number of the spherical particles in the section of the conductive resin layers 24a and 24b is regarded as the ratio of the number of the spherical particles to the number of the flat particles.

Figure 4:
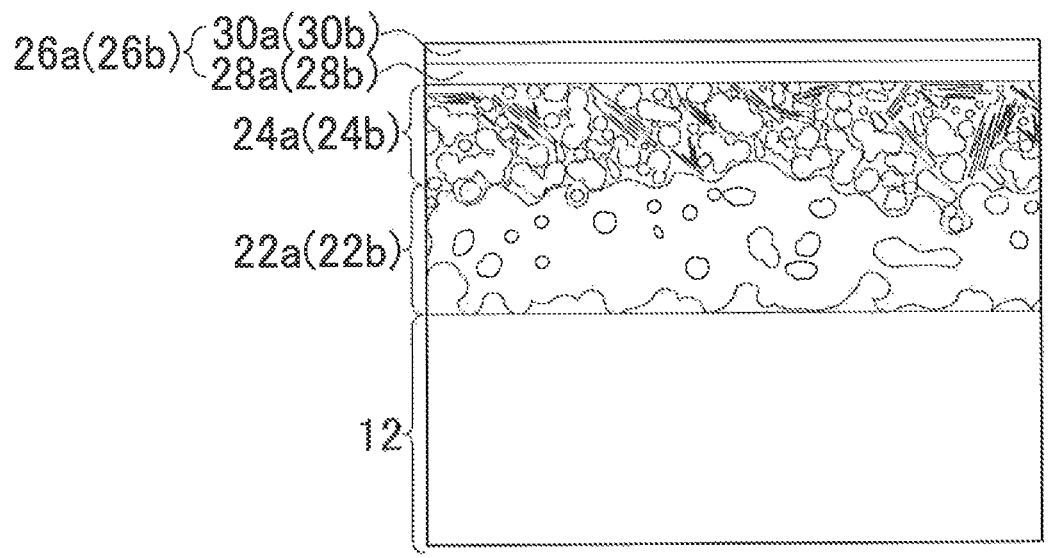
FIG. 4 is an enlarged partial view illustrating a cross section of a central portion of the multilayer ceramic capacitor shown in FIG. 1 in the width direction thereof.

The section of a central portion in the width direction of the multilayer ceramic capacitor 10 observed as described above is a surface defined in the length direction and the thickness direction of the multilayer ceramic capacitor 10 and the section is exposed by fixing the multilayer ceramic capacitor 10 with a resin and grinding a portion including the internal electrodes 16a and 16b and the external electrodes 20a and 20b up to the central portion in the width direction of the multilayer ceramic capacitor 10. In addition, surface treatment is performed to avoid sagging due to grinding, and the section including the conductive resin layers 24a and 24b is observed at, for example, a 1000 times magnification by using SEM. FIG. 4 is an enlarged partial view showing the section.

The reason for the ratio of about 3/7 to about 7/3 of the number of the spherical particles to the number of the flat particles in the metal particles contained in the conductive resin layers 24a and 24b is that a ratio larger than about 7/3 causes a state having a small number of the flat particles and a large number of the spherical particles, and electric connection is secured, but the ceramic element body is easily cracked by deflection stress due to insufficient stress relaxation. On the other hand, a ratio smaller than about 3/7 causes a state having a large number of the flat particles and a small number of the spherical particles, and stress relaxation is secured, but electric connection cannot be secured to increase equivalent series resistance.

In addition, a base metal Ni or Sn preferably is used as the second metal powder contained in the conductive resin layers 24a and 24b. The second metal powder may have a spherical shape or a fish-scale-shaped configuration, and the second metal powder preferably has an average particle diameter of about 10 μm to about 50 μm, for example, and is a very fine powder.

Examples of the resin contained in the conductive resin layers 24a and 24b include, but are not limited to, thermosetting resin such as phenol resins, acrylic resins, silicone resins, epoxy resins, polyimide resins, and the like.

When a section containing an interface between the sintered metal layer 22a and the conductive resin layer 24a in the external electrode 20a is observed, glass is present on the surface of the sintered metal layer 22a at the interface, and a ratio L1/L2 preferably is about 0.2 or more and about 1.5 or less, for example, where L1 is the length of the glass along the interface and L2 is the length of a metal portion other than glass in the sintered metal layer 22a along the interface. That is, L1 is a length along the interface at which the glass of the sintered metal layer is exposed at the interface, and L2 is a length along the interface at which the metal of the sintered metal layer is exposed at the interface. Similarly, when a section including an interface between the sintered metal layer 22b and the conductive resin layer 24b in the external electrode 20b is observed, glass is present on the surface of the sintered metal layer 22b at the interface, and a ratio L1/L2 preferably is about 0.2 or more and about 1.5 or less, for example, where L1 is the length of the glass along the interface and L2 is the length of a metal portion other than glass in the sintered metal layer 22b along the interface. That is, L1 is a length along the interface at which the glass of the sintered metal layer is exposed at the interface, and L2 is a length along the interface at which the metal of the sintered metal layer is exposed at the interface.

Like the section described above, the section of the multilayer ceramic capacitor 10 observed as described is a surface defined in the length direction and the thickness direction of the multilayer ceramic capacitor 10 and the section is exposed by fixing the multilayer ceramic capacitor 10 with a resin and grinding a portion including the internal electrodes 16a and 16b and the external electrodes 20a and 20b up to the central portion in the width direction of the multilayer ceramic capacitor 10. In addition, as described above, surface treatment is performed to avoid sagging due to grinding, and the section including the external electrodes 20a and 20b is observed at, for example, a 1000 times magnification by using SEM. FIG. 4 is an enlarged partial view showing the section.

When a section containing an interface between the sintered metal layer 22a (22b) and the conductive resin layer 24a (24b) in the external electrode 20a (20b) is observed, glass is present on the surface of the sintered metal layer 22a (22b) at the interface, and a ratio L1/L2 preferably is about 0.2 or more and about 1.5 or less, for example, where L1 is the length of the glass along the interface and L2 is the length of a metal portion other than glass in the sintered metal layer 22a (22b) along the interface. That is, L1 is a length along the interface at which the glass of the sintered metal layer is exposed at the interface, and L2 is a length along the interface at which the metal of the sintered metal layer is exposed at the interface. This is because when the ratio L1/L2 is larger than about 1.5, the amount of glass at the interface is increased, and thus the resistance value between the sintered metal layer 22a (22b) and the conductive resin layer 24a (24b) is increased. On the other hand, when the ratio L1/L2 is smaller than about 0.2, the amount of glass in the sintered metal layer 22a (22b) is decreased, and thus the adhesive strength between the sintered metal layer 22a (22b) and the ceramic element body 12 is decreased.

Also, in order to enhance the adhesive strength between the sintered metal layer 22a (22b) and the ceramic element body 12, it is necessary to incorporate a predetermined amount of glass into the sintered metal layer 22a (22b). In this case, when the sintered metal layer 22a (22b) is baked to the ceramic element body 12, the glass is precipitated on the surface of the sintered metal layer 22a (22b). That is, the glass is precipitated at the interface between the sintered metal layer 22a (22b) and the conductive resin layer 24a (24b), and the length of glass along the interface 50 μm is preferably about 10 μm or more and about 30 μm or less, for example. When the length of glass is less than about 10 μm, the glass is not sufficiently contained, and thus the adhesive strength between the sintered metal layer 22a (22b) and the ceramic element body 12 is weakened. When the length of glass exceeds about 30 μm, a contact area between the conductor of the sintered metal layer 22a (22b) and the conductor of the conductive resin layer 24a (24b) cannot be secured, and thus the resistance value therebetween is increased, resulting in the tendency to increase equivalent series resistance. The plating layer 26a preferably includes a Ni plating layer 28a and a Sn plating layer 30a, for example. Similarly, the plating layer 26b preferably includes a Ni plating layer 28b and a Sn plating layer 30b, for example.

The Ni plating layers 28a and 28b are formed preferably by electroplating the surfaces of the conductive resin layers 24a and 24b with Ni, and a thickness of each of the Ni plating layers 28a and 28b preferably is, for example, about 1 μm to about 5 μm. The Ni plating layers 28a and 28b are configured to define and function as barrier layers.

The conductive resin layers 24a and 24b are formed preferably by applying resin and metal particles on the sintered metal layers 22a and 22b and then thermally curing the resin. In this case, a plurality of recesses can be formed in the surfaces of the conductive resin layers 24a and 24b by adjusting the curing conditions of the resin. After the conductive resin layers 24a and 24b are formed, the recesses may be formed in the surfaces of the conductive resin layers 24a and 24b by applying a physical external force, such as, for example, performing sand blasting.

Figure 5:
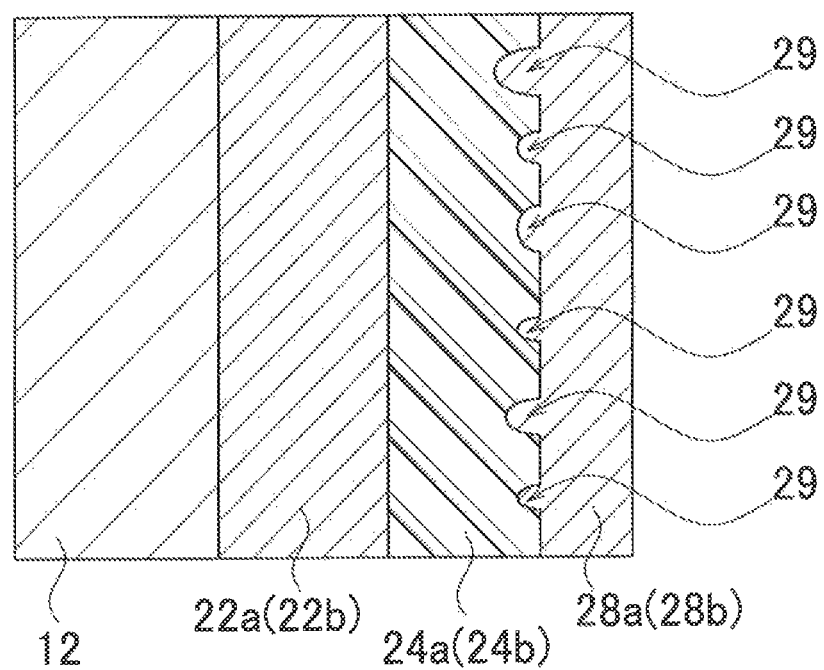
FIG. 5 is a diagram illustrating an interface between a conductive resin layer and a Ni plating layer in which projections extend from the Ni plating layer to the conductive resin layer.

The Ni plating layers 28a and 28b are formed on the conductive resin layers 24a and 24b, respectively, in which the recesses have been formed. Since the recesses have been formed in the surfaces of the conductive resin layers 24a and 24b, the Ni plating layers 28a and 28b enter at least some of the recesses to form projections 29 at additional interfaces between the conductive resin layers 24 and 24b and the plating layers 28a and 28b so that the projections 29 project from the Ni plating layers 28a and 28b to the conductive resin layer side as shown in FIG. 5. In this case, the projections 29 projecting from the Ni plating layers 28a and 28b on the surfaces of the conductive resin layers 24a and 24b into the recesses of the conductive resin layers 24a and 24b preferably have a depth within a range of about 1.0 μm to about 7.0 μm, for example. When the depth of two or more projections 29 present within a length along the additional interface of about 80 μm is less than about 1.0 μm, for example, entering of the Ni plating layers 28a and 28b into the conductive resin layers 24a and 24b is insufficient, and thus a satisfactory anchor effect cannot be obtained. When the depth of the projections 29 exceeds about 7.0 μm, Ni plating is captured by the conductive resin layers 24a and 24b, and thus the surfaces of the Ni plating layers 28a and 28b are concaved, thus deteriorating mountability of the multilayer ceramic capacitor 10 on a substrate. In order to remove the recess of the surfaces of the Ni plating layers 28a and 28b, it is considered to sufficiently thicken the Ni plating, but this is undesirable for the efficiency of production because a longer time is required for thickening the Ni plating. Further, the projections 29 are preferably present at three or more positions along the additional interface in the width direction or the thickness direction.

Figure 6:
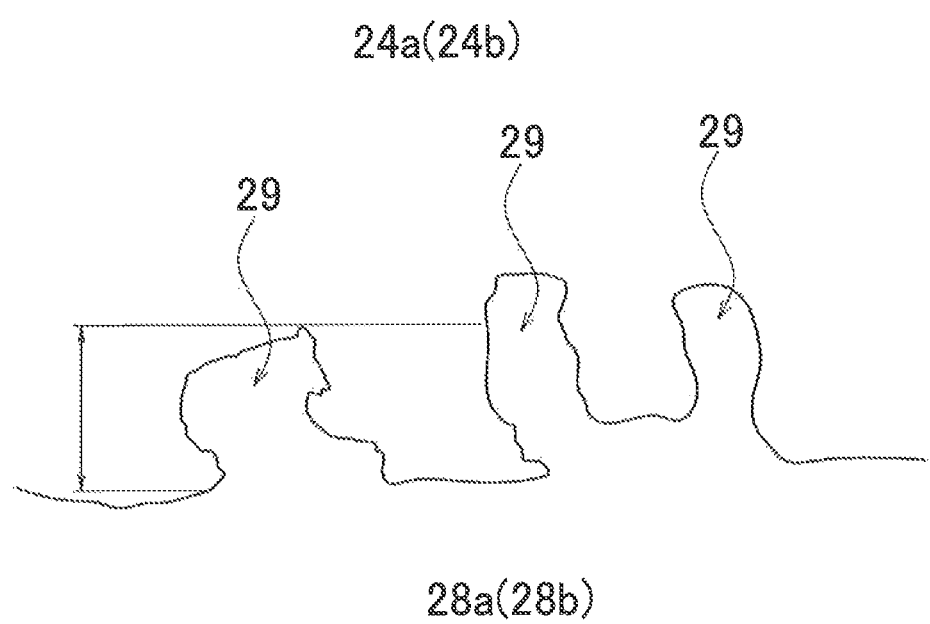
FIG. 6 is a diagram illustrating the size of the projections shown in FIG. 5.

The projections 29 projecting from the Ni plating layers 28a and 28b to the conductive resin layer side are observed with a section of the multilayer ceramic capacitor 10. The section is a surface defined in the length direction and the thickness direction of the multilayer ceramic capacitor 10 and a section exposed by grinding the multilayer ceramic capacitor 10 up to a central portion in the width direction is used. In addition, surface treatment is performed to avoid sagging due to grinding, and the additional interfaces between the conductive resin layers 24a and 24b and the Ni plating layers 28a and 28b are observed at a 1000 times magnification by using an SEM. Among the depth of each projection 29 measured from the Ni plating layer on both sides of the projection, as shown in FIG. 6, a large value is regarded as the size of the projection 29.

Further, the Sn plating layers 30a and 30b are formed preferably by electroplating the surfaces of the Ni plating layers 28a and 28b with Sn, and the thickness of each of the Sn plating layers 30a and 30b preferably is, for example, about 1 μm to about 5 μm, for example. The Sn plating layers 30a and 30b are configured to function to improve solderability.

When a section including the additional interface between the conductive resin layer 24a and the plating layer 26a in the external electrode 20a is observed, the number of the metal particles exposed from the conductive resin layer 24a is preferably 50 to 250 per a length of about 1 mm at the additional interface between the conductive resin layer 24a and the plating layer 26a, for example. Similarly, when a section including the additional interface between the conductive resin layer 24b and the plating layer 26b in the external electrode 20b is observed, the number of the metal particles exposed from the conductive resin layer 24b preferably is 50 to 250 per a length of about 1 mm at the additional interface between the conductive resin layer 24b and the plating layer 26b.

The section of the multilayer ceramic capacitor 10 observed as described above is a surface defined in the length direction and the thickness direction of the multilayer ceramic capacitor 10 and the section is exposed by fixing the multilayer ceramic capacitor 10 with a resin and grinding a portion including the internal electrodes 16a and 16b and the external electrodes 20a and 20b up to the central portion in the width direction of the multilayer ceramic capacitor 10. In addition, as described above, the section is surface-treated to avoid sagging due to grinding, and the section including the conductive resin layers 24a and 24b is observed at, for example, a 1000 times magnification by using SEM. FIG. 4 is an enlarged partial view showing the section.

When a section including the additional interface between the conductive resin layer 24a (24b) and the plating layer 26a (26b) in the external electrode 20a (20b) is observed, the number of the metal particles exposed from the conductive resin layer 24a (24b) preferably is 50 to 250 per a length of 1 mm at the interface between the conductive resin layer 24a (24b) and the plating layer 26a (26b). This is because when the number of metal particles exposed from the conductive resin layer 24a (24b) is less than 50, concentration of electrolysis occurs in a small number of the exposed metal particles, and thus water is electrolyzed to produce hydrogen, which may cause defects in the plating layer 26a (26b). When the number of metal particles exposed from the conductive resin layer 24a (24b) is larger than 250, the amount of the resin in the conductive resin layer 24a (24b) is decreased, and thus when the multilayer ceramic capacitor 10 is mounted on a substrate, the resistance strength of the multilayer ceramic capacitor 10 against deflection of the substrate may be decreased.

The multilayer ceramic capacitor 10 preferably has, for example, a substantially rectangular parallelepiped shape having a length L of about 1 mm, a width W of about 0.5 mm, and a thickness T of about 0.55 mm.

In the multilayer ceramic capacitor 10, the internal electrodes 16a and 16b preferably have a layer shape and are stacked in a direction connecting the main surfaces 12a and 12b of the ceramic element body 12.

In the multilayer ceramic capacitor 10, the ratio of the number of the spherical particles to the number of the flat particles in the metal particles contained in the conductive resin layers 24a and 24b preferably is about 3/7 to about 7/3, for example, and thus the relaxation of stress and electric connection are balanced. Therefore, the multilayer ceramic capacitor 10 has good resistance and good electric characteristics.

Further, in a section of the multilayer ceramic capacitor 10, the number of recesses within a length along the interface of about 70 μm at each of the interfaces between the sintered metal layers 22a and 22b and the conductive resin layers 24a and 24b preferably is 2 or less, and thus adhesion between the sintered metal layers 22a and 22b and the conductive resin layers 24a and 24b is greatly increased.

In the multilayer ceramic capacitor 10, a ratio of L1/L2 preferably is about 0.2 more and about 1.5 or less, and thus the resistance value between the sintered metal layers 22a and 22b and the conductive resin layers 24a and 24b is suppressed, and adhesive strength between the sintered metal layers 22a and 22b and the ceramic element body 12 becomes satisfactory. Therefore, in the multilayer ceramic capacitor 10, equivalent series resistance is significantly reduced or suppressed.

In addition, when the section including the additional interface between the conductive resin layer 24a (24b) and the plating layer 26a (26b) in the multilayer ceramic capacitor 10 is observed, the metal particles are preferably present in a number of 50 to 250 per a length along the additional interface of about 1 mm on the conductive rein layer 24a (24b) at the additional interface. Therefore, a concentration of electrolysis does not occur in the metal particles, and thus the occurrence of hydrogen is significantly reduced or prevented, and defects in the plating layer 26a (26b) are prevented. In addition, when mounted on a substrate, the multilayer ceramic capacitor 10 has satisfactory resistance strength against deflection of the substrate.

Further, in the multilayer ceramic capacitor 10, the projections are configured to project from the Ni plating layers 28a and 28b to the conductive resin layers 24a and 24b, respectively, and thus separation between the conductive resin layers 24a and 24b and the Ni plating layers 28a and 28b is significantly reduced or prevented from occurring due to the anchor effect. Therefore, even when reflow soldering is performed to mount the multilayer ceramic capacitor 10 on a substrate, moisture contained in the conductive resin layers 24a and 24b is not ejected, and thus solder popping is prevented.

In the multilayer ceramic capacitor 10, $t1>t2$ is preferably satisfied, and each of t1 and t2 preferably is about 10 μm or more and about 40 μm or less, for example.

Therefore, in the multilayer ceramic capacitor 10, each of the external electrodes 20a and 20b preferably is configured to include a convex central portion, and an amount of convexity in the central portion is smaller than that near the external layers.

Therefore, in the multilayer ceramic capacitor 10, the external electrodes 20a and 20b preferably has a thin flat configuration, and thus equivalent series resistance is significantly reduced or prevented.

When in the multilayer ceramic capacitor 10, the amount of convexity of the external electrodes 20a and 20 is excessively large, the external electrodes 20a and 20b become thick, thus increasing the equivalent series resistance.

Also, when the multilayer ceramic capacitor 10 is mounted on a substrate, tensile stress is applied to the external electrodes 20a and 20b on both ends of the ceramic element body 12. However, the external electrodes 20a and 20b each preferably include a convex central portion, and thus stress is easily relaxed.

In the multilayer ceramic capacitor 10, when the external electrodes 20a and 20b are completely flat, stress cannot be easily relaxed.

In addition, in the multilayer ceramic capacitor 10, the metal particles contained in the conductive resin layers 24a and 24b preferably contain Cu or Ag, and thus good conductivity is secured in the conductive resin layers 24a and 24b.

Further, in the multilayer ceramic capacitor 10, the sintered metal layers 22a and 22b preferably include Cu, and thus good conductivity is secured in the sintered metal layers 22a and 22b.

Further, in the multilayer ceramic capacitor 10, the plating layers 26a and 26b include the Ni plating layers 28a and 28b, respectively, and thus moisture inside of the plating layers 26a and 26b is trapped by the Ni plating layers 28a and 28b, respectively. Therefore, during reflow mounting, solder popping in which the moisture contained inside of the plating layers 26a and 26b is popped together with solder is prevented.

In the multilayer ceramic capacitor 10, in each of the external electrodes 20a and 20b, the thickness T5 of a portion located on the first main surface 12a or the second main surface 12b of the ceramic element body 12 is larger than the thickness T3 of a portion located on each of the end surfaces 12e and 12f of the ceramic element body 12. Therefore, when the multilayer ceramic capacitor 10 is mounted on a mounting substrate, each of the external electrodes 20a and 20b has a larger thickness on the mounting substrate side, thus easily relaxing the stress applied to the multilayer ceramic capacitor 10.

In the multilayer ceramic capacitor 10, the plating layers 26a and 26b include Ni plating layers 28a and 28b, respectively, and the thickness of each of the Ni plating layers 28a and 28b preferably is about 1 μm to about 5 μm, for example. Therefore, although the external electrodes 20a and 20b are flat to some extent, moisture contained inside of the plating layers 26a and 26b is trapped by the Ni plating layers 28a and 28b because the Ni plating layers 28a ad 28b are thick. Therefore, for example, during reflow mounting, solder popping in which the moisture contained inside of the plating layers 26a and 26b is popped together with solder is prevented.

Further, in the multilayer ceramic capacitor 10, the external electrodes 20a and 20b are provided on the first main surface 12a and the second main surface 12b of the ceramic element body 12, thus facilitating mounting using any one of the first main surface 12a and the second main surface 12b as a mounting surface.

In addition, in the multilayer ceramic capacitor 10, the external electrodes 20a and 20b are also provided on the first side surface 12c and the second side surface 12d of the ceramic element body 12, thus improving moisture-proof reliability.

Next, a non-limiting example of a method for manufacturing the multilayer ceramic capacitor 10 is described.

First, ceramic green sheets containing a ceramic material and constituting the ceramic element body 12 (ceramic layers 14) are prepared.

Next, a conductive paste is applied on each of the ceramic green sheets to form a conductive pattern. The conductive paste can be applied by, for example, a printing method such as a screen printing method or the like. The conductive paste may contain a binder and a solvent in addition to the conductive fine particles.

Then, a plurality of the ceramic green sheets not having the conductive patterns formed thereon, the ceramic green sheets having the conductive patterns formed thereon in a shape corresponding to the first or second internal electrode, and a plurality of the ceramic green sheets not having the conductive patterns formed thereon are stacked in that order and then pressed in the stacking direction to form a mother stack.

Then, the mother stack is cut along virtual cut lines on the mother stack to form a plurality of ceramic green stacks from the mother stack. The mother stack can be cut by dicing or push cutting. The edges and corners of the ceramic green stack may be rounded by barrel grinding.

Then, the ceramic green stack is fired. In the firing step, the first and second internal electrodes are fired. The firing temperature can be appropriately determined according to the types of the ceramic material and conductive paste used. The firing temperature may be, for example, about 900° C. to about 1300° C.

Then, the conductive paste is applied to both ends of the ceramic stack (ceramic element body) after firing by a method such as dipping.

Next, the conductive paste applied to the ceramic stack is dried with hot air at about 60° C. to about 180° C. for approximately 10 minutes.

Then, the dried conductive paste is baked to form the sintered metal layers. In this case, the number of recesses formed in the surface of each of the sintered metal layers can be changed by changing the baking temperature for forming the sintered metal layers. In addition, the material of the conductive resin layers which enters the recesses can be adjusted by adjusting a dimension of the inlet and depth of the recesses in the surfaces of the sintered metal layers. Therefore, high adhesion can be achieved between the sintered metal layers and the conductive resin layers.

Then, a mixture containing a first metal powder of Cu or Ag which forms metal particles of the conductive resin layers, a second metal powder having a predetermined average particle diameter, and a resin is heat-cured to form the conductive resin layer on each of the sintered metal layers.

In this case, the ratio of the number of the spherical particles to the number of the flat particles of the metal particles contained in each of the conductive resin layers preferably is about 3/7 to about 7/3, for example. This can be achieved by, for example, adjusting the ratio between materials that form the flat particles and the spherical particles in the material of the conductive resin layers or adjusting a formation condition of the conductive resin layers, such as the heating temperature of the mixture used as the material of the conductive resin layers.

Also, in this case, in a section including each of the additional interfaces between the conductive resin layers and the plating layers, the number of the metal particles exposed from the conductive resin layer preferably is 50 to 250 per a length of about 1 mm at each of the additional interfaces between the conductive resin layers and the plating layers, for example. This can be achieved by, for example, adjusting the ratio between the first metal powder, the second metal powder, and the resin in the material of the conductive resin layers or adjusting a formation condition of the conductive resin layers, such as the heating temperature of the mixture used as the material of the conductive resin layers.

Similarly, the recesses can be formed in the surfaces of the conductive resin layers by adjusting the formation conditions of the conductive resin layers. Also, the recesses can be formed in the surfaces of the conductive resin layers by applying physical external force, for example, by performing sand blasting.

Then, plating layers (Ni plating layer and Sn plating layer) are formed on each of the conductive resin layers preferably by electrolytic plating, thus completing the multilayer ceramic capacitor 10. The Ni plating enters the recesses formed in the surfaces of the conductive resin layers, and thus projections projecting from the Ni plating layer to the conductive resin layer are provided.

Experimental Examples

As an example, 20 multilayer ceramic capacitors 10 according to a preferred embodiment of the present invention described above were formed.

As a comparative example, 20 multilayer ceramic capacitors each having 2 or more recesses within a length of 70 μm at an interface between a sintered metal layer and a conductive resin layer were formed. The multilayer ceramic capacitors had the same design structure except the number of recesses.

Each of the multilayer ceramic capacitors was mounted on a substrate, and the substrate was deflected. In this case, separation occurred between the sintered metal layer and the conductive resin layer of each of 5 multilayer ceramic capacitors among the 20 multilayer ceramic capacitors of the comparative example. On the other hand, in each of the multilayer ceramic capacitors of the example, deflection occurred at the interface between the sintered metal layer and the conductive resin layer.

Although, in the example of the preferred embodiment described above, the external electrodes were formed on the side surfaces of the ceramic element body, the external electrodes may not be formed on the side surfaces of the ceramic element body. The external electrodes may be formed only on the end surfaces and on at least the first main surface or the second main surface of the ceramic element body. When the external electrodes are formed on a multilayer ceramic electronic component in this manner, the multilayer ceramic electronic component can be easily mounted using as a mounting surface the first main surface or the second main surface on which the external electrode is formed.

Although, in the example of the preferred embodiments described above, a plating layer preferably includes a Ni plating layer and a Sn plating layer, for example, the plating layer may include one plating layer or three or more plating layers, for example.

Although, in the example of the preferred embodiments described above, dielectric ceramic was preferably used as a material of the ceramic element body, in the present invention, magnetic ceramic such as ferrite, semiconductor ceramic such as spinel-type ceramic, piezoelectric ceramic such as PZT-type ceramic, or the like can be used as the material of the ceramic element body according to the types of multilayer ceramic electronic components.

When magnetic ceramic is used as the ceramic element body, a multilayer ceramic electronic component defines and functions as a multilayer ceramic inductor; when semiconductor ceramic is used as the ceramic element body, a multilayer ceramic electronic component defines and functions as a multilayer ceramic thermistor; and when piezoelectric ceramic is used as the ceramic element body, a multilayer ceramic electronic component defines and functions as a multilayer ceramic piezoelectric component. However, when a multilayer ceramic electronic component defines and functions as a multilayer ceramic inductor, an internal electrode includes a coil-shaped conductor.

Although, in the example of the preferred embodiments described above, a multilayer ceramic capacitor having a specified configuration is described as an example, the configuration of a multilayer ceramic capacitor according to the present invention may be arbitrarily changed within the scope of the configuration defined by the claims.

In particular, a multilayer ceramic electronic component according to various preferred embodiments of the present invention can be preferably used as a multilayer ceramic capacitor, a multilayer ceramic inductor, a multilayer ceramic thermistor, a multilayer ceramic piezoelectric component, or the like.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
   a ceramic element body in which internal electrodes are provided and which includes a first main surface, a second main surface facing the first main surface, a first side surface connected to the first main surface and the second main surface, a second side surface facing the first side surface, a first end surface connected to the first main surface, the second main surface, the first side surface, and the second side surface, and a second end surface facing the first end surface; and
   external electrodes arranged on at the least the first and second end surfaces and at least a portion of the first main surface or the second main surface of the ceramic element body so as to be electrically connected to respective ones of the internal electrodes; wherein
   each of the external electrodes includes a sintered metal layer, a conductive resin layer, and a plating layer which are arranged in that order from the ceramic element body;
   the conductive resin layer includes resin and metal particles;
   the sintered metal layer includes glass and metal;
   when a cross section including an interface between the sintered metal layer and the conductive resin layer is viewed from any one of the first main surface, the second main surface, the first side surface, and the second side surface, the sintered metal layer includes a plurality of recesses each including an inlet extending along the interface and an inner portion extending from the interface into the sintered metal layer, each of the recesses having a shape in which a dimension of the inner portion is larger than a dimension of the inlet measured along the interface; and
   L1/L2 is about 0.2 or more and about 1.5 or less, where L1 is a length along the interface at which the glass of the sintered metal layer is exposed at the interface, and L2 is a length along the interface at which the metal of the sintered metal layer is exposed at the interface.

2. The multilayer ceramic electronic component according to claim 1, wherein the metal of the sintered metal layer includes Cu.

3. The multilayer ceramic electronic component according to claim 2, wherein the metal particles of the conductive resin layer include Cu and/or Ag.

4. The multilayer ceramic electronic component according to claim 3, wherein the plating layer includes a Ni plating layer.

5. A multilayer ceramic electronic component comprising:
a ceramic element body in which internal electrodes are provided and which includes a first main surface, a second main surface facing the first main surface, a first side surface connected to the first main surface and the second main surface, a second side surface facing the first side surface, a first end surface connected to the first main surface, the second main surface, the first side surface, and the second side surface, and a second end surface facing the first end surface; and
external electrodes arranged on at the least the first and second end surfaces and at least a portion of the first main surface or the second main surface of the ceramic element body so as to be electrically connected to respective ones of the internal electrodes; wherein
each of the external electrodes includes a sintered metal layer, a conductive resin layer, and a plating layer which are arranged in that order from the ceramic element body;
the conductive resin layer includes resin and metal particles;
the sintered metal layer includes glass and metal;
when a cross section including an interface between the sintered metal layer and the conductive resin layer is viewed from any one of the first main surface, the second main surface, the first side surface, and the second side surface, the sintered metal layer includes a plurality of recesses each including an inlet extending along the interface and an inner portion extending from the interface into the sintered metal layer, each of the recesses having a shape in which a dimension of the inner portion is larger than a dimension of the inlet measured along the interface;
L1/L2 is about 0.2 or more and about 1.5 or less, where L1 is a length along the interface at which the glass of the sintered metal layer is exposed at the interface, and L2 is a length along the interface at which the metal of the sintered metal layer is exposed at the interface; and
a material of the conductive resin layer is disposed in at least some of the recesses.

6. The multilayer ceramic electronic component according to claim 5, wherein at least some of the metal particles of the conductive resin layer are disposed in the at least some of the recesses.

7. The multilayer ceramic electronic component according to claim 6, wherein at least some of the resin of the conductive resin layer is disposed in the at least some of the recesses.

8. The multilayer ceramic electronic component according to claim 6, wherein the metal of the sintered metal layer includes Cu.

9. The multilayer ceramic electronic component according to claim 8, wherein the metal particles of the conductive resin layer include Cu and/or Ag.

10. The multilayer ceramic electronic component according to claim 9, wherein the plating layer includes a Ni plating layer.

11. A multilayer ceramic electronic component comprising:
a ceramic element body in which internal electrodes are provided and which includes a first main surface, a second main surface facing the first main surface, a first side surface connected to the first main surface and the second main surface, a second side surface facing the first side surface, a first end surface connected to the first main surface, the second main surface, the first side surface, and the second side surface, and a second end surface facing the first end surface; and
external electrodes arranged on at the least the first and second end surfaces and at least a portion of the first main surface or the second main surface of the ceramic element body so as to be electrically connected to respective ones of the internal electrodes; wherein
each of the external electrodes includes a sintered metal layer, a conductive resin layer, and a plating layer which are arranged in that order from the ceramic element body;
the conductive resin layer includes resin and metal particles;
the sintered metal layer includes glass and metal;
when a cross section including an interface between the sintered metal layer and the conductive resin layer is viewed from any one of the first main surface, the second main surface, the first side surface, and the second side surface, the sintered metal layer includes a plurality of recesses each including an inlet extending along the interface and an inner portion extending from the interface into the sintered metal layer, each of the recesses having a shape in which a dimension of the inner portion is larger than a dimension of the inlet measured along the interface;
L1/L2 is about 0.2 or more and about 1.5 or less, where L1 is a length along the interface at which the glass of the sintered metal layer is exposed at the interface, and L2 is a length along the interface at which the metal of the sintered metal layer is exposed at the interface;
a material of the conductive resin layer is disposed in at least some of the recesses; and
the metal particles include first particles and second particles with shapes that are different from the first particles.

12. The multilayer ceramic capacitor according to claim 11, wherein
a ratio of a number of the second particles to a number of the first particles is about 3/7 to about 7/3; and
the first particles have spherical or substantially spherical shapes, and the second particles have flat or substantially flat shapes.

13. The multilayer ceramic capacitor according to claim 12, wherein at least some of the metal particles of the conductive resin layer are disposed in the at least some of the recesses.

14. The multilayer ceramic electronic component according to claim 13, wherein
the metal of the sintered metal layer includes Cu;
the metal particles of the conductive resin layer include Cu and/or Ag; and
the plating layer includes a Ni plating layer.

15. The multilayer ceramic capacitor according to claim 11, wherein
a ratio of a number of the second particles to a number of the first particles is about 3/7 to about 7/3;
the first particles are configured such that a ratio of a long side to a short side is about 5/1 or more in a cross section of the metal particles; and
the second particles are configured such that a ratio of a long side to a short side is less than about 5/1 in a cross section of the metal particles.

16. The multilayer ceramic capacitor according to claim 15, wherein at least some of the metal particles of the conductive resin layer are disposed in the at least some of the recesses.

17. The multilayer ceramic electronic component according to claim 16, wherein the metal of the sintered metal layer includes Cu;
the metal particles of the conductive resin layer include Cu and/or Ag; and
the plating layer includes a Ni plating layer.

\* \* \* \* \*